Oct. 29, 1929.                L. FREEDMAN                1,733,957
                                PISTON
                           Filed Aug. 29, 1928
Fig. 1.
Fig. 2.
Fig. 3.
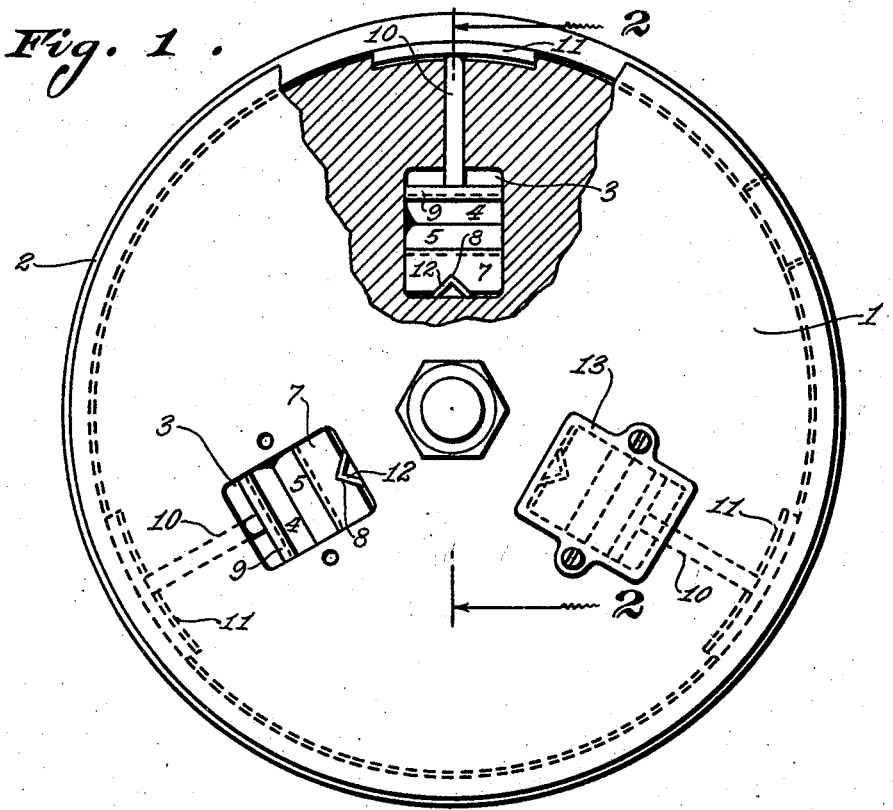
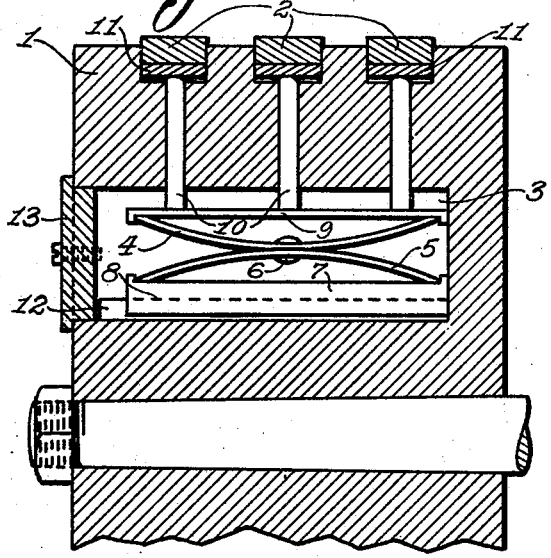
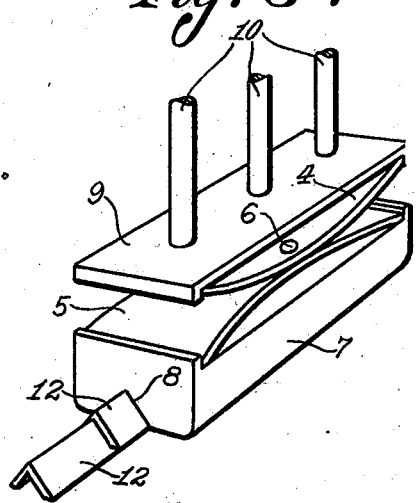
Inventor:
LOUIS FREEDMAN,
By John H. Bruninga,
His Attorney.

Patented Oct. 29, 1929

1,733,957

UNITED STATES PATENT OFFICE

LOUIS FREEDMAN, OF UNIVERSITY CITY, MISSOURI, ASSIGNOR TO FREEDMAN PISTON CORPORATION, OF ST. LOUIS, MISSOURI

PISTON

Application filed August 29, 1928. Serial No. 302,714.

This invention pertains to pistons for steam engines, and more particularly to locomotive engine pistons.

In the regular operation of locomotive engines, the piston packing rings are subject to very rapid wear, so that they must be renewed at frequent intervals. With the ordinary construction of pistons, such renewal requires the removal of the piston from the cylinder, an operation which may take a day or two.

One of the objects of this invention is to provide a piston construction which will make it possible to take up the wear of the packing rings in a short time and with a minimum of labor.

Another object is to provide a construction by which the wear may be taken up without removing the piston from the cylinder.

Another object is to provide means whereby a definite adjustment of the expansion of the packing rings may be made.

Further objects will appear from the following description, taken in connection with the accompanying drawing, in which—

Figure 1 is an end view of a locomotive piston embodying this invention, shown partly in section;

Figure 2 is a partial section on line 2—2 of Figure 1; and

Figure 3 is a detail of the expanding device.

Referring to the drawing, 1 designates the piston body, which may be of any suitable construction and which may be provided with expansible packing rings 2 mounted in grooves in the body 1 in the usual manner.

In accordance with this invention, the body 1 has formed therein a plurality of axially extending recesses 3. In each of these recesses is housed a spring device, shown in perspective in Figure 3. This comprises a spring element composed of a pair of leaf springs 4 and 5, riveted or otherwise secured together at 6 adjacent their middle point. The spring device is mounted on a lower abutment plate 7 provided with a groove 8 along its lower face. An upper abutment plate 9 is mounted upon the spring element and is adapted to bear against the ends of a series of pins 10 extending outwardly from the spring device through suitable perforations in the body 1. The pins 10 may bear at their outer ends against bearing plates 11, which in turn bear against the packing rings 2 in order to expand the same. The pressure of the springs 4 and 5 forces the pins 10 outwardly, which thus provide thrust members adapted to force the rings outwardly against the cylinder wall.

In order to take up wear on the rings, one or more adjusting elements 12 may be inserted in the groove 8, so as to raise the lower abutment plate 7, thereby increasing the tension of the springs 4 and 5. In the embodiment shown, the groove 8 is formed as an inclined angular groove or V-groove, and the elements 12 have a similar angular form so as to fit the groove. The elements 12, being of angular form, are adapted to nest one within the other so that successive adjustments may be made by simply inserting another adjusting element within the last previous one.

It will be seen that this invention provides means whereby the tension on the packing rings of a locomotive engine may be maintained at a proper value with little trouble. A plurality of spring devices is provided which are spaced circumferentially about the piston so as to exert their tension uniformly in all directions. This arrangement not only insures a uniform pressure of the packing rings against the cylinder wall, but also tends to hold the piston centrally in the cylinder, so that the abnormal wear on the bottom of the cylinder due to the weight of the piston resting thereon, may be avoided. By providing a single spring device, which furnishes the pressure for all three packing rings, the pressure on those rings may be made uniform. The spring device being housed in a recess, which extends axially and is open at the head end of the piston or that end which faces the cylinder head, access may be had to the spring device for adjustment by simply removing the cylinder head. That operation may take not more than ten minutes, and the adjustment of the ring tension is made by simply driving in an additional adjusting element 12 under each of the spring devices. The recess 3 may be closed by a suitable cap 13, so as to insure that the adjusting elements will be maintained in place.

It is obvious that various changes may be made, within the scope of the appended claims, in the details of construction without departing from the spirit of this invention. It is, therefore, to be understood that this invention is not to be limited to the specific details shown and/or described.

Having thus described the invention, what is claimed is:

1. In a piston of the character described, having a body and an expansible packing ring mounted therein, a spring device for expanding said ring having a recess adapted to receive an adjusting element, and a series of adjusting elements adapted for nesting in said recess.

2. In a piston of the character described having a body and an expansible packing ring mounted therein, a spring device for expanding said ring having an inclined angular recess adapted to receive an adjusting element, and a series of angular adjusting elements adapted for nesting in said recess.

3. In a piston of the character described having a body and an expansible packing ring mounted therein, an axially extending recess in said body, a spring device housed in said recess and resting on the bottom thereof and a thrust member extending outwardly from said device adapted to expand said ring.

4. In a piston of the character described having a body and an expansible packing ring mounted therein, an axially extending recess in said body, a spring device housed in said recess and resting on the bottom thereof, a thrust member extending outwardly from said device adapted to expand said ring, and an adjusting element for said device.

5. In a piston of the character described having a body and an expansible packing ring mounted therein, an axially extending recess in said body, a spring device housed in said recess and resting on the bottom thereof, a thrust member extending outwardly from said device adapted to expand said ring, said device having a recess adapted to receive an adjusting element, and an adjusting element insertible in said recess to expand said ring.

6. In a piston of the character described having a body and an expansible packing ring mounted therein, an axially extending recess in said body, a spring device housed in said recess, a thrust member extending outwardly from said device adapted to expand said ring, said device having an inclined angular recess adapted to receive an adjusting element, and a series of angular adjusting elements adapted for nesting in said recess.

7. In a piston of the character described having a body and a plurality of expansible packing rings mounted therein, an axially extending recess in said body, a spring device housed in said recess and resting on the bottom thereof, and a plurality of thrust members extending outwardly from said device adapted to expand said rings.

8. In a piston of the character described having a body and a plurality of expansible packing rings mounted therein, an axially extending recess in said body, a spring device housed in said recess and resting on the bottom thereof, a plurality of thrust members extending outwardly from said device adapted to expand said rings, and an adjusting element for said device.

9. In a piston of the character described having a body and a plurality of expansible packing rings mounted therein, an axially extending recess in said body, a spring device housed in said recess and resting on the bottom thereof, a plurality of thrust members extending outwardly from said device adapted to expand said rings, said device having a recess adapted to receive an adjusting element insertible in said recess to expand said rings.

10. In a piston of the character described having a body and a plurality of expansible packing rings mounted therein, an axially extending recess in said body, a spring device housed in said recess, a plurality of thrust members extending outwardly from said device adapted to expand said rings, said device having an inclined angular recess adapted to receive an adjusting element, and a series of angular adjusting elements adapted for nesting in said recess.

11. In a piston of the character described having a body and a plurality of expansible packing rings mounted therein, a plurality of axially extending recesses in said body and spaced circumferentially thereabout, a spring device housed in each of said recesses and resting on the bottom thereof, and a plurality of thrust members extending outwardly from each of said devices adapted to expand said rings.

12. In a piston of the character described having a body and a plurality of expansible packing rings mounted therein, a plurality of axially extending recesses in said body and spaced circumferentially thereabout, a spring device housed in each of said recesses and resting on the bottom thereof, a plurality of thrust members extending outwardly from each of said devices adapted to expand said rings, and means for adjusting the tension of said devices.

13. In a piston of the character described having a body and a plurality of expansible packing rings mounted therein, a plurality of axially extending recesses in said body and spaced circumferentially thereabout, a spring device housed in each of said recesses and resting on the bottom thereof, a plurality of thrust members extending outwardly from each of said devices adapted to expand said rings, each of said devices having a recess adapted to receive an adjusting element, and an adjusting element insertible in said recess to expand said rings.

14. In a piston of the character described having a body and a plurality of expansible packing rings mounted therein, a plurality of axially extending recesses in said body and spaced circumferentially thereabout, a spring device housed in each of said recesses, a plurality of thrust members extending outwardly from each of said devices adapted to expand said rings, each of said devices having an inclined angular recess adapted to receive an adjusting element, and a series of angular adjusting elements adapted for nesting in said recess in order to expand said rings.

15. In a piston of the character described having a body and a plurality of expansible packing rings mounted therein, a spring device for expanding said rings, comprising, a spring member, an upper abutment plate mountable on said member, a lower abutment plate upon which said member is mounted, and means for adjusting said lower plate radially.

16. In a piston of the character described having a body and a plurality of expansible packing rings mounted therein, a spring device for expanding said rings, comprising, a spring member, an upper abutment plate mountable on said member, and a lower abutment plate upon which said member is mounted, said lower abutment plate having a V-groove along the lower face thereof adapted to receive an adjusting element.

17. In a piston of the character described having a body and a plurality of expansible packing rings mounted therein, a spring device for expanding said rings, comprising, a spring member, an upper abutment plate mountable on said member, a lower abutment plate upon which said member is mounted, said lower abutment plate having a V-groove along the lower face thereof adapted to receive an adjusting element.

18. A piston of the character described having a body and an expansible packing ring mounted therein, an axially extending recess in said body, a spring device housed in said recess and resting on the bottom thereof, and means for connecting said device with said packing ring to expand the same.

19. A piston of the character described having a body and an expansible packing ring mounted therein, an axially extending recess in said body, a spring device housed in said recess and resting on the bottom thereof, means for connecting said device with said packing ring to expand the same, and a closure for said recess.

20. A piston of the character described having a body and an expansible packing ring mounted therein, an axially extending recess in said body, a spring device housed in said recess and resting on the bottom thereof, means for connecting said device with said packing ring to expand the same, and means adjustable axially of said recess for tensioning said device.

21. A piston of the character described having a body and an expansible packing ring mounted therein, an axially extending recess in said body, a spring device housed in said recess and resting on the bottom thereof, means for connecting said device with said packing ring to expand the same, means adjustable axially of said recess for tensioning said device, and a closure for said recess.

In testimony whereof I affix my signature this 16th day of August, 1928.

LOUIS FREEDMAN.